(12) United States Patent
Cavallaro, III et al.

(10) Patent No.: US 8,756,817 B2
(45) Date of Patent: Jun. 24, 2014

(54) METHOD AND APPARATUS FOR REMOVING PERIPHERAL PORTION OF A GLASS SHEET

(75) Inventors: Nicholas Dominic Cavallaro, III, Corning, NY (US); Keith Mitchell Hill, Horseheads, NY (US); Harry J Reidy, Horseheads, NY (US); Liming Wang, Painted Post, NY (US); Zheming Zheng, Horseheads, NY (US); Naiyue Zhou, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 246 days.

(21) Appl. No.: 13/307,503

(22) Filed: Nov. 30, 2011

(65) Prior Publication Data

US 2013/0134200 A1    May 30, 2013

(51) Int. Cl.
*B67B 7/00*    (2006.01)

(52) U.S. Cl.
USPC .................................................. 30/2; 30/96

(58) Field of Classification Search
USPC ............. 225/96, 96.5, 2–5; 83/879–881, 886, 83/887
See application file for complete search history.

(56) References Cited

U.S. PATENT DOCUMENTS

| 4,196,830 | A | 4/1980 | Oravitz et al. ..................... 225/2 |
| 4,227,635 | A | 10/1980 | Delettre ........................ 225/96.5 |
| 2008/0264994 | A1 | 10/2008 | Herve et al. ...................... 225/2 |
| 2009/0126403 | A1 | 5/2009 | Abramov et al. ............. 65/29.18 |
| 2010/0107848 | A1 | 5/2010 | Joseph et al. .................... 83/862 |

FOREIGN PATENT DOCUMENTS

JP    2011190039    9/2011    ............. B65G 40/06

*Primary Examiner* — Omar Flores Sanchez
(74) *Attorney, Agent, or Firm* — Matthew J. Mason; William J. Tucker (57) ABSTRACT

Process for removing peripheral portions such as bead regions of a glass sheet including a step of pushing the glass sheet in the peripheral portion using a pushing mechanism such as a pushing bar, and corresponding apparatus. As a result of the use of the pushing mechanism, the engagement completion time for suction cups, if used, are reduced significantly. A process without using suction cups is enabled with enhanced yield. The increased process stability and enlarged process window are particularly advantageous for processing glass sheets having high flexibility.

24 Claims, 5 Drawing Sheets

METHOD AND APPARATUS FOR REMOVING PERIPHERAL PORTION OF A GLASS SHEET

FIELD

The present invention relates to method and apparatus for glass sheet periphery finishing. In particular, the present invention relates to method and apparatus for removing a peripheral portion of a glass sheet. The present invention is useful, e.g., for removing the bead regions of a glass sheet formed from a down-draw process for use as glass substrates for displays.

TECHNICAL BACKGROUND

Thin glass sheets have found use in many optical, electronic or optoeletronic devices, such as liquid crystal displays (LCD), organic light-emitting diode (OLED) displays, solar cells, as semiconductor device substrates, color filter substrates, cover sheets, and the like. The thin glass sheets, having a thickness from several micrometers to several millimeters, may be fabricated by a number of methods, such as float process, fusion down-draw process (a method pioneered by Corning Incorporated, Corning, N.Y., U.S.A.), slot down-draw process, and the like.

In many of the applications of thin glass sheets, it is highly desired that the glass sheets have (i) pristine surface quality essentially free of scratches, particles, and other defects; (ii) high thickness uniformity; (iii) low surface roughness and waviness. To that end, in the forming process for making the glass sheets, typically direct contact of the center region of major surfaces of the as-formed glass sheet with solid surfaces is avoided. Instead, only the peripheral region of the glass sheet was subjected to direct contact with solid surfaces such as edge rolls, pulling rolls, edge guiding rolls, and the like. Thus, the peripheral portions of both sides of an as-formed glass sheet obtained directly from the forming device, such as in the bottom-of-draw area of a fusion down-draw or slot down-draw process, sometimes called "beads," tend to have lower surface quality than the center region of the major surfaces. In addition, depending on the specific forming device used, the peripheral portions tend to have different thickness and significantly higher thickness variation than the center region.

Various glass sheet bead removal technologies were used or proposed previously with a different yield, yield consistency, and cost of the processes and equipment.

The display market has shown increasing demand for glass sheets with high flexibility, i.e., those with large sheet width and/or length, and/or very small thickness. The present inventors have found that, for glass sheets with high flexibility, bead removal can be a significant challenge and an overall yield bottleneck in a glass sheet manufacture process. Thus, an acceptable bead removal process for a glass sheet with relatively low flexibility may be unacceptable for a glass sheet with significantly higher flexibility.

Thus, there is a genuine need of a robust glass sheet bead removal process with acceptable capability for glass sheets with high and/or low flexibility. The present invention satisfies this and other needs.

SUMMARY

Several aspects of the present invention are disclosed herein. It is to be understood that these aspects may or may not overlap with one another. Thus, part of one aspect may fall within the scope of another aspect, and vice versa.

Each aspect is illustrated by a number of embodiments, which, in turn, can include one or more specific embodiments. It is to be understood that the embodiments may or may not overlap with each other. Thus, part of one embodiment, or specific embodiments thereof, may or may not fall within the ambit of another embodiment, or specific embodiments thereof, and vice versa.

Thus a first aspect of the present disclosure is a process for removing a first peripheral portion of a glass sheet, comprising the following steps:

(I) providing a glass sheet having a first major surface, a second major surface opposing the first major surface, a center region having a center thickness Th(C) and an average center temperature T(C), an upper edge surface, a lower edge surface, a first side edge surface and a second side edge surface, each edge surface connecting the first major surface and the second major surface, and the first peripheral portion in the vicinity of the first edge surface having an average thickness Th(B), where Th(B)>1.1 Th(C); in certain embodiments Th(B)>1.5 Th(C); in certain other embodiments Th(B) >1.8 Th(C); in certain other embodiments Th(B)>2.0 Th(C);

(II) placing the glass sheet in a predetermined position by securing the first and second major surfaces in the vicinity of the upper edge surface to a suspension device;

(III) after step (II), restraining the first and second major surfaces in the vicinity of the first side edge at a distance D1 from the end of the first edge surface from the upper edge surface to the lower edge surface;

(IV) after step (II), restraining at least the second major surface in the vicinity of the first side edge surface at a distance D3 from the end of the first edge surface using a first mechanical restrainer, where D3<D1;

(V) heating at least part of the first peripheral portion of the glass sheet such that the average temperature of the first peripheral portion at the location having the distance D3 from the end of the first edge surface reaches a temperate T(B), where T(B)−T(C)≥40° C.;

(VI) after step (V), forming a score-line on the first major surface extending from the vicinity of the upper edge surface to the vicinity of the lower edge surface at a distance from the end of the first edge surface D2, where D3<D2<D1;

(VII) contacting the second major surface with a nosing strip opposing the score-line; and (VIII) after steps (V) and (VI), moving the second major surface in a direction away from the first major surface by the first mechanical restrainer, such that the first peripheral portion of the glass sheet in the vicinity of the first side edge bends against the nosing strip, and separates along the score-line from the center region of the glass sheet.

In certain embodiments of the process according to the first aspect of the present disclosure, in step (V), T(B)−T(C)≥50° C., in certain embodiments T(B)−T(C)≥60° C., in certain embodiments T(B)−T(C)≥70° C., in certain embodiments T(B)−T(C)≥80° C., in certain embodiments T(B)−T(C)≥90° C., in certain embodiments T(B)−T(C)≥100° C., in certain embodiments T(B)−T(C)≥110° C., in certain embodiments T(B)−T(C)≥120° C., in certain embodiments T(B)−T(C) ≥130° C., in certain embodiments T(B)−T(C)≥140° C., in certain embodiments T(B)−T(C)≥150° C., in certain embodiments T(B)−T(C)≤200° C., in certain embodiments T(B)−T(C)≤190° C., in certain embodiments T(B)−T(C)≤180° C., in certain embodiments (B)−T(C)≤170° C., in certain embodiments T(B)−T(C)≥160° C.

In certain embodiments of the process according to the first aspect of the present disclosure, in step (I), the center thickness Th(C) of the glass sheet is at most 400 μm, in certain embodiments at most 300 µm, in certain other embodiments at most 200 µm, in certain other embodiments at most 100 µm.

In certain embodiments of the process according to the first aspect of the present disclosure, in step (I), the glass sheet has a height of at least 1000 cm, in certain embodiments at least 1200 cm, in certain other embodiments at least 1500 cm, in certain other embodiments at least 1800 cm, in certain other embodiments at least 2000 cm, in certain other embodiments at least 2500 cm, in certain other embodiments at least 3000 cm.

In certain embodiments of the process according to the first aspect of the present disclosure, in step (I), the glass sheet has a width of at least 1000 cm, in certain embodiments at least 1200 cm, in certain other embodiments at least 1500 cm, in certain other embodiments at least 1800 cm, in certain other embodiments at least 2000 cm, in certain other embodiments at least 2500 cm, in certain other embodiments at least 3000 cm.

In certain embodiments of the process according to the first aspect of the present disclosure, in step (I), the first peripheral portion of the glass sheet as provided is warped in the direction from the upper edge surface to the lower edge surface when the glass sheet has a substantially uniform temperature at room temperature and is not subjected to an external force.

In certain embodiments of the process according to the first aspect of the present disclosure, in step (I), the first peripheral portion of the glass sheet as provided comprises a first section with knurled surface at least on the side of the second major surface, and a second section adjacent to the first section with a smooth surface on the side of the second major surface.

In certain embodiments of the process according to the first aspect of the present disclosure, in step (IV), the first mechanical restrainer comprises a plurality of suction cups adapted for contacting and engaging with the second major surface at distance D3 and a vertical pushing bar adapted for contacting and pushing the first major surface towards the suction cups, and step (IV) comprises:
(IV-1) pushing the first major surface towards the second major surface; and
(IV-2) engaging the suction cups with the second major surface.

In certain embodiments of the process according to the first aspect of the present disclosure, in step (IV-2), the engagement of the plurality of suction cups to the second major surface of the first peripheral portion is completed in at most 5 seconds, in certain embodiments in at most 1 second, in certain other embodiments in at most 0.5 second, in certain other embodiment in at most 0.4 second, in certain other embodiments in at most 0.3 second.

In certain embodiments of the process according to the first aspect of the present disclosure, in step (IV), the first mechanical restrainer comprises a first pair of clamps adapted for contacting and engaging with the first major surface and the second major surface at distance D3, and step (IV) comprises:
(IV-1) engaging the first pair of clamps with the first and second major surfaces.

In certain embodiments of the process according to the first aspect of the present disclosure, in step (IV), the engagement of the first pair of clamps to the first major surface and the second major surface of the first peripheral portion is completed in at most 5 seconds, in certain embodiments in at most 1 second, in certain other embodiments in at most 0.5 second, in certain other embodiment in at most 0.4 second, in certain other embodiments in at most 0.3 second.

In certain embodiments of the process according to the first aspect of the present disclosure, in step (II), the first and second major surfaces in the vicinity of the upper edge surface are secured to a suspension device by using clamps.

In certain embodiments of the process according to the first aspect of the present disclosure, in step (III), the first and second major surfaces in the vicinity of the first side edge are secured by a second pair of clamps at a distance D1 from the end of the first edge surface.

In certain embodiments of the process according to the first aspect of the present disclosure, the second pair of clamps extends from the upper edge surface to the lower edge surface.

In certain embodiments of the process according to the first aspect of the present disclosure, step (VII) precedes step (VI), and in step (VI), a mechanical score wheel is used to press against the first major surface and form the score-line.

In certain embodiments of the process according to the first aspect of the present disclosure, the glass sheet is made by a down-draw process.

In certain embodiments of the process according to the first aspect of the present disclosure, in step (IV), the score-line is formed by using a laser beam.

In certain embodiments of the process according to the first aspect of the present disclosure, 5 cm≤D1≤50 cm, in certain embodiments 5 cm≤D1≤40 cm, in certain embodiments 5 cm≤D1≤30 cm, in certain embodiments 5 cm≤D1≤20 cm, in certain embodiments 5 cm≤D1≤15 cm, in certain other embodiments 5≤D1≤10 cm.

In certain embodiments of the process according to the first aspect of the present disclosure, 4 cm≤D2≤40 cm, in certain embodiments 4 cm≤D2≤35 cm, in certain embodiments 4 cm≤D2≤30 cm, in certain embodiments 4 cm≤D2≤20 cm, in certain embodiments 4 cm≤D2≤15 cm, in certain other embodiments 4 cm≤D2≤10 cm.

In certain embodiments of the process according to the first aspect of the present disclosure, 0.5 cm≤D3≤20 cm, in certain embodiments 0.5 cm≤D3≤15 cm, in certain embodiments 0.5 cm≤D3≤10 cm, in certain embodiments 0.5 cm≤D3≤8 cm, in certain embodiments 0.5 cm≤D3≤5 cm, in certain other embodiments 0.5 cm≤D3≤3 cm.

In certain embodiments of the process according to the first aspect of the present disclosure, in step (V), the first pair of clamps extends from the upper edge surface to the lower edge surface.

In certain embodiments of the process according to the first aspect of the present disclosure, step (V) comprises:
(V-1) measuring the stress profile of the first peripheral portion;
(V-2) identifying the area in the first peripheral portion having the highest average residual stress;
(V-3) providing a heating irradiation from a heater; and
(V-4) directing the highest heating power of the heating irradiation to the area in the first peripheral portion having the highest average residual stress.

In certain embodiments of the process according to the first aspect of the present disclosure, the suspension device in step (II) is part of a glass conveying device.

In certain embodiments of the process according to the first aspect of the present disclosure, step (IV) precedes step (VI).

In certain embodiments of the process according to the first aspect of the present disclosure, step (VI) precedes step (IV).

In certain embodiments of the process according to the first aspect of the present disclosure, in step (VI), the nosing strip has a hardness not lower than the glass sheet.

In certain embodiments of the process according to the first aspect of the present disclosure, in step (VI), the nosing strip is mounted on a support that is sufficiently rigid such that during step (IV), the nosing strip remains substantially linear when the score wheel presses the first major surface of the glass against the nosing strip.

A second aspect of the present disclosure relates to an apparatus for removing a first peripheral portion of a glass sheet having a first major surface, a second major surface opposing the first major surface, a center region having a center thickness Th(C), an upper edge surface, a lower edge surface, a first side edge surface and a second side edge surface, each edge surface connecting the first major surface and the second major surface, and the first peripheral portion in the vicinity of the first edge surface, comprising the following:

(A) a glass suspension device adapted for placing the glass sheet in a predetermined position by securing the first and second major surfaces in the vicinity of the upper edge surface;

(B) a first edge restraining tower located on the side of the first major surface comprising a first edge restraining clamp strip, and a second edge restraining tower located on the side of the second major surface comprising a second edge restraining clamp strip, the distance between the first edge restraining clamp strip and the second edge restraining clamp strip being adjustable and adapted for restraining the first and second major surfaces in the vicinity of the first side edge at a distance D1 from the end of the first edge surface from the upper edge surface to the lower edge surface;

(C) a mechanical scoring wheel installed on the first edge restraining tower adapted for vertical motion in contact with the first major surface to form a score-line on the first major surface extending from the vicinity of the upper edge surface to the lower edge surface at a distance from the end of the first edge surface D2, where D2<D1;

(C) a first vertical edge clamps adapted for engaging and clamping the first and second major surfaces of the first peripheral portion at a distance from the end of the first edge surface D3, where D3<D2;

(E) a nosing strip opposing the score-line adapted for contacting the second major surface;

(F) a vertical heating element adapted for preferentially heating at least part of the first peripheral portion of the glass sheet; and (G) a force applicator adapted for moving the second major surface in a direction away from the first major surface by the first pair of clamps, such that the first peripheral portion of the glass sheet in the vicinity of the first side edge bends against the nosing strip, and separates along the score-line from the center region of the glass sheet.

In certain embodiments of the apparatus according to the second aspect of the present disclosure, the nosing strip has a hardness not lower than the glass sheet.

In certain embodiments of the apparatus according to the second aspect of the present disclosure, the nosing strip is supported by a seat that is sufficiently rigid such that the nosing strip remains substantially linear when the score wheel presses the first major surface of the glass against the nosing strip.

In certain embodiments of the apparatus according to the second aspect of the present disclosure, the nosing strip comprises a material selected from aluminum, steel, copper and alloys thereof, and polyimide.

In certain embodiments of the apparatus according to the second aspect of the present disclosure, the vertical heating element extends from the upper edge surface to the lower edge surface.

In certain embodiments of the apparatus according to the second aspect of the present disclosure, the vertical heating element comprises a linear infrared irradiation emitting device located on one side of the first peripheral portion and a mirror located on the opposite side.

In certain embodiments of the apparatus according to the second aspect of the present disclosure, the vertical heating element is selected from: Pt windings; SiC bars; tungsten filament; and $MoS_2$ bars.

In certain embodiments of the apparatus according to the second aspect of the present disclosure, the vertical heating element has a width of from 25 mm to 100 mm, in certain embodiments from 40 to 80 mm, in certain other embodiments from 50 to 80 mm.

In certain embodiments of the apparatus according to the second aspect of the present disclosure, the heating power of each vertical heating element ranges from 1 KW to 20 KW, in certain embodiments from 2 KW to 15 KW, in certain other embodiments from 3 KW to 10 KW, in certain other embodiments from 4 KW to 8 KW.

In certain embodiments of the apparatus according to the second aspect of the present disclosure, the heating power of the vertical heating element has a non-uniform output power from the top to the bottom.

A third aspect of the present disclosure relates to an apparatus for removing a first peripheral portion of a glass sheet having a first major surface, a second major surface opposing the first major surface, a center region having a center thickness Th(C), an upper edge surface, a lower edge surface, a first side edge surface and a second side edge surface, each edge surface connecting the first major surface and the second major surface, and the first peripheral portion in the vicinity of the first edge surface, comprising the following:

(A) a glass suspension device adapted for placing the glass sheet in a predetermined position by securing the first and second major surfaces in the vicinity of the upper edge surface;

(B) a first edge restraining tower located on the side of the first major surface comprising a first edge restraining clamp strip, and a second edge restraining tower located on the side of the second major surface comprising a second edge restraining clamp strip, the distance between the first edge restraining clamp strip and the second edge restraining clamp strip being adjustable and adapted for restraining the first and second major surfaces in the vicinity of the first side edge at a distance D1 from the end of the first edge surface from the upper edge surface to the lower edge surface;

(C) a mechanical scoring wheel installed on the first edge restraining tower adapted for vertical motion in contact with the first major surface to form a score-line on the first major surface extending from the vicinity of the upper edge surface to the lower edge surface at a distance from the end of the first edge surface D2, where D2<D1;

(D) a straight, vertical bar adapted for pushing the first major surface toward the second major surface;

(E) a vertical heating element adapted for preferentially heating at least part of the first peripheral portion of the glass sheet;

(F) a nosing strip opposing the score-line adapted for contacting the second major surface; and (G) a force applicator adapted for moving the second major surface in a direction away from the first major surface by the first pair of clamps, such that the first peripheral portion of the glass sheet in the vicinity of the first side edge bends against the nosing strip, and separates along the score-line from the center region of the glass sheet.

In certain embodiments of the apparatus according to the third aspect of the present disclosure, the nosing strip has a hardness not lower than the glass sheet.

In certain embodiments of the apparatus according to the third aspect of the present disclosure, the nosing strip is supported by a seat that is sufficiently rigid such that the nosing strip remains substantially linear when the score wheel presses the first major surface of the glass against the nosing strip.

In certain embodiments of the apparatus according to the third aspect of the present disclosure, the nosing strip comprises a material selected from aluminum, steel, copper and alloys there, and polyimide.

In certain embodiments of the apparatus according to the third aspect of the present disclosure, the vertical heating element extends from the upper edge surface to the lower edge surface.

In certain embodiments of the apparatus according to the third aspect of the present disclosure, the vertical heating element comprises a linear infrared irradiation emitting device located on one side of the first peripheral portion and a mirror located on the opposite side.

One or more embodiments and/or aspects of the present disclosure have the following advantages. First, by using a heating element to preferentially heat the peripheral portion having a bead region, the stress inside the glass sheet in the peripheral region can be significantly relieved, resulting in easier surface scoring, more uniform score-line, less surface slippage in scoring, and higher yield in the scoring step. The impact of bead heating on scoring is especially pronounced for thin glass sheets having a Th(C) of at most 500 μm, more advantageous for those having a Th(C) of at most 400 μm, still more advantageous for those having a Th(C) of at most 300 μm, still more advantageous for those having a Th(C) of at most 200 μm. Furthermore, the preferential heating of the bead region, by relieving the residual stress, results in an overall glass sheet with reduced warp, thereby facilitating the engagement of the ribbon surface with restraining devices, especially suction cups. The impact of preferential bead heating on scoring and sheet warp is especially pronounced for thin glass sheets having a Th(C) of at most 500 μm, more advantageous for those having a Th(C) of at most 400 μm, still more advantageous for those having a Th(C) of at most 300 μm, still more advantageous for those having a Th(C) of at most 200 μm. The thinner the glass, the more dramatic the impact of the residual stress on sheet shape is.

Additional features and advantages of the invention will be set forth in the detailed description which follows, and in part will be readily apparent to those skilled in the art from the description or recognized by practicing the invention as described in the written description and claims hereof, as well as the appended drawings.

It is to be understood that the foregoing general description and the following detailed description are merely exemplary of the invention, and are intended to provide an overview or framework to understanding the nature and character of the invention as it is claimed.

The accompanying drawings are included to provide a further understanding of the invention, and are incorporated in and constitute a part of this specification.

DETAILED DESCRIPTION

As mentioned supra, the process and apparatus of the present disclosure are particularly advantageous for removing the bead regions of a glass sheet, and as such, will be subsequently illustrated in the context of bead region removal. However, one having ordinary skill in the art should readily appreciate that, upon reading the specification of the present application and with the benefit of the teachings herein, the process and apparatus of the present disclosure may be used for removing a peripheral portion of any glass sheet, which may or may not be a region comprising a bead. For example, the process and apparatus as disclosed herein can be used to resize a glass sheet without a bead region.

For the convenience of description, a glass sheet is a piece of glass material having two major surfaces i.e., a first major surface and a second major surface, with a width, a length, and a thickness defined as the distance from the first major surface to the second major surface. The first and second major surfaces are connected, at four sides, by an upper edge surface, a lower edge surface, a first side edge surface and a second side edge surface. The upper edge surface, the lower edge surface, the first side edge surface and the second side edge surface may be substantially planar or curved. Where an edge surface is curved, it would extend, in the direction from the end of the edge surface to the centerline of the glass sheet, for a distance of at most 1 cm before it is connected with the first and/or the second major surfaces.

For the convenience of description, the various steps of the processes in accordance with various aspects and embodiments of the present disclosure are numbered as (I), (II), . . . (VIII), and the like. It is to be understood that, unless specifically indicated otherwise or the context indicates to the contrary, the steps can be carried out in any order, simultaneously or sequentially.

Figure 1A:
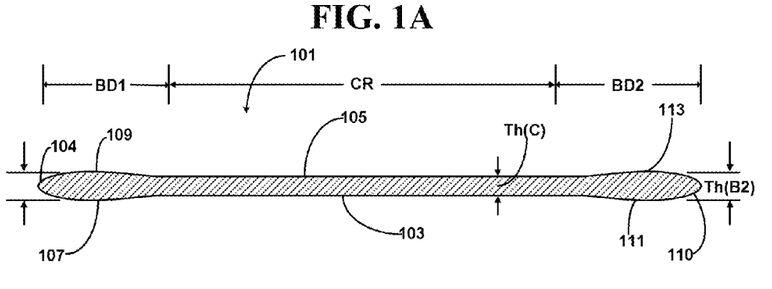
FIGS. 1A and 1B are schematic illustrations of the cross-sectional view and front view of a glass sheet comprising a center region and two bead regions that may be subjected to peripheral region removal according to the present disclosure.
Figure 1B:
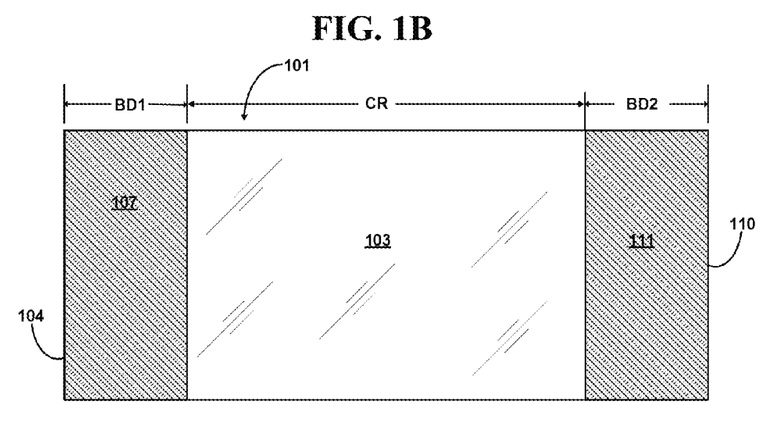

FIG. 1A schematically illustrates the cross-sectional view of a glass sheet 101 formed at the bottom-of-the-draw by a fusion down-draw process intercepted by a plane substantially perpendicular to the first and second major surfaces. This glass sheet 101 can be advantageously finished using the apparatus and method of the present disclosure. The glass sheet 101 has: a first major surface 103; a second major surface 105; a curved first side edge surface 104 having an end with the largest distance from the center line of the first major surface, and a curved second side edge surface 110 having an end with the largest distance from the center line of the first major surface, each connecting the first major surface 103 and the second major surface 105, respectively. The glass sheet 101 comprises a center region (CR) having a substantially uniform thickness Th(C), a first bead region BD1 corresponding and adjacent to the first side edge surface 104, having a curved first bead surface 107 and a curved second bead surface 109 on each side of the glass sheet, and a second bead region BD2 corresponding and adjacent to the second side edge surface 110, having a curved third bead surface 111 and a curved fourth bead surface 113. The maximal thickness of the first bead region BD1, defined as the maximal thickness thereof when intercepted by virtual planes perpendicular to a flattened first major surface 103 and/or second major surface 105 in the center region, is Th(B1). The second bead region BD2 has a maximal thickness Th(B2), which may be substantially the same or different from Th(B1). Likewise, the first bead region BD1 and the second bead region BD2 may have the same or different width. FIG. 1B schematically illustrates the front view of the same glass sheet when viewed in the direction from the first major surface 103 to the second major surface 105.

The center region CR of the glass sheet with high, pristine surface quality is sometimes called quality region. Normally, in the process of manufacturing an electronic/optic device based on a glass substrate, functional devices, such as semiconductor devices, other electronic devices and optical devices, and the like, are formed on a major surface of the glass sheet only after the first and second bead regions are removed. After the removal of both edge portions, the glass sheet may be then subjected to edge finishing such as grinding and polishing, followed by cleaning and drying, before functional devices such transistors and the like are deposited on the quality area CR of one or two of the first and second major surfaces.

As used herein, a first peripheral portion of a glass sheet is a portion thereof corresponding to and in the vicinity of the first side edge surface intended to be removed from the rest of the glass sheet. The center region of the glass sheet is normally the portion thereof intended to be retained and used for a subsequent application. Referring to FIGS. 1A and 1B, the first peripheral portion of the glass sheet 101 advantageously corresponds to the first bead region BD1. Below the present invention is described and illustrated with respect the first peripheral portion only. However, one having ordinary skill in the art, having benefited from the disclosure herein upon reading the present disclosure, should readily appreciate that in a real glass sheet peripheral portion finishing process, either or both of the first peripheral portion and the second peripheral portion may be processed according to the various aspects and embodiments of the process of the present disclosure using an apparatus according to various aspects and embodiments of the present disclosure. Indeed, it is also possible that the peripheral portions of the glass sheet adjacent to the upper edge surface and the lower edge surface may be processed in substantially the same manner as the first peripheral portion upon a 90° rotation of the glass sheet. Such processing of multiple peripheral portions of the glass sheet can be carried out sequentially or simultaneously. In certain specifically advantageous embodiments, the first and second peripheral portions of the same glass sheet may be processed substantially simultaneously in a substantially synchronized and symmetric manner.

In step (II), the glass sheet 101 is placed in a predetermined position, such as a substantially horizontal position where the gravitational acceleration vector is substantially perpendicular to a flattened first major surface 103, or a substantially vertical position where the gravitational acceleration vector is substantially parallel to the first major surface 103 of the glass sheet 101. It is highly desired that, during all steps (II) to (VIII), the position of the glass sheet is substantially stable, i.e., the angle between the gravitational acceleration vector and the first major surface does not vary more than 10°, in certain embodiments not more than 8°, in certain other embodiments not more than 6°, in certain other embodiments not more than 5°, in certain other embodiments not more than 4°, in certain embodiments not more than 3°, in certain other embodiments not more than 2°. The placing of the glass sheet into the predetermined position is advantageously effected by restraining the first and second major surfaces in the vicinity of the upper edge surface to a suspension device. In a particularly advantageous embodiment, the glass sheet is placed in a substantially vertical position, i.e., the first and/or second major surfaces of the glass sheet are oriented at a angle of at most 10°, in certain embodiments at most 8°, in certain other embodiments at most 6°, in certain other embodiments at most 4°, in certain other embodiments at most 2°, in certain other embodiments at most 1°, relative to the gravitational acceleration vector.

Figure 5:
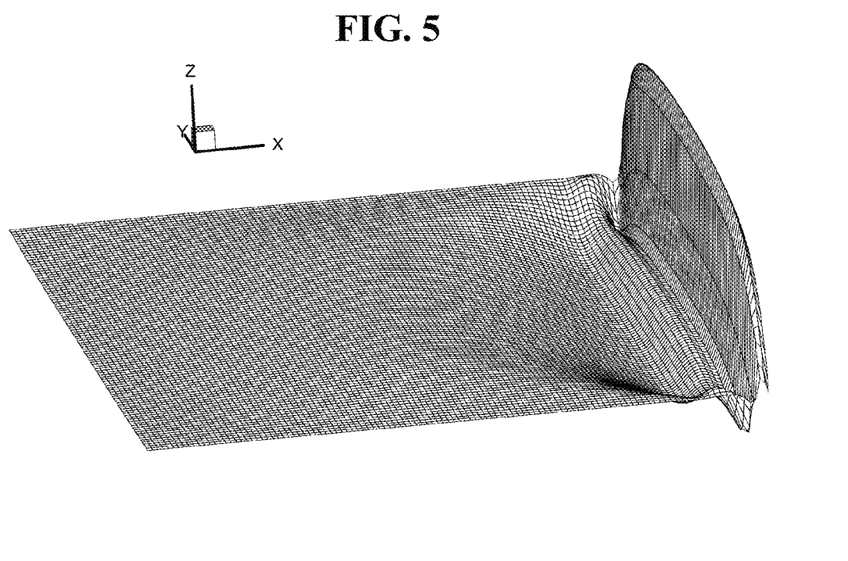
FIG. 5 is a diagram showing residual stress distribution in a glass sheet having a bead region before preferential bead heating.

A relatively large glass sheet with a relatively thin thickness made in a real glass sheet manufacture process, such as a fusion down-draw process, a float process or a slot down-draw process, will exhibit a natural curvature, sometimes called "warp," if it has a substantially uniform temperature around the room temperature in a gravity-free environment, due to the presence of various level of internal stress distributed in the glass sheet as a result of the unique mechanical and/or thermal history the glass sheet has been subjected to. For example, in a typical fusion down-draw process, the glass sheet is formed by drawing a viscous glass ribbon formed at the root of a forming device called isopipe into desired width and thickness while cooling it to a viscoelastic state, and eventually elastic state. Mechanical rollers contact the peripheral region, called beads, while the glass ribbon is being drawn-down. Discrete glass sheets are then cut from a continuous glass ribbon, normally with the beads remaining in place, and finally cooled to around room temperature. The glass material in the glass sheet was subjected to slightly different thermal history from one side to the other, and from the top to the bottom. For example, the bead region of the glass ribbon normally has a larger thickness, and therefore would normally cool down at a slower rate compared to the thinner, center region, in the same cooling environment. The differential thermal history causes internal residual stress in the glass sheet when the glass sheet is at a substantially uniform temperature at around room temperature. FIG. 5 is a diagram showing the stress distribution profile of a part of an exemplary glass sheet made by a fusion down-draw process. Shown on the x-axis is distance from the centerline of the glass sheet, on the y-axis is the distance from the upper edge of the sheet, and on the z-axis is stress. The rightmost peripheral portion comprising a bead exhibits the highest stress of up to 3225 psi, while the center region has substantially zero stress. This residual stress distribution profile can impart a curvature to the glass sheet, sometimes called warp, as mentioned supra. The warp will be three-dimensional in nature: it will be present vertically from the upper edge surface, and horizontally from the first side edge surface to the second side edge surface.

When a glass sheet exhibits a natural warp in a gravity-free environment, it will normally exhibit a natural warp if it is hung from the upper edge in the gravity field if no further external restraint is imposed to counteract the internal stress. The presence of the residual stress inside the glass sheet and the natural curvature of the glass sheet, when hung at a vertical position, makes the removal of the peripheral portion such as the bead region difficult for several reasons. First, the warp makes engagement of peripheral portion restraining devices such as suction cups to the glass surface difficult. Second, the warp can lead to score-wheel slippage in certain areas, and too high a normal force applied by the score-wheel to the glass surface in other areas, resulting in less than desired score-line quality and possibly glass sheet fracture during scoring. Third, the stress present in the peripheral portion toughens the glass sheet material, reducing the effectiveness of the mechanical scoring operation. Fourth, the stress present in the peripheral region can lead to undesirable glass sheet breakage during scoring. All these difficulties are exacerbated for glass sheets with reduced thicknesses, such as those having a Th(C) of at most 300 µm, 200 µm, or 100 µm.

The methods and apparatuses of the present disclosure are particularly advantageous for removing the peripheral portions of such glass sheet that would normally exhibit a gravity-free warp when at a substantially uniform temperature around room temperature, for reasons to be explained in greater detail and depth infra. Such advantages are achieved by, inter alia, preferential heating of the bead region of the glass sheet to establish a temperature gradient from the bead region to the central region (CR) of the glass sheet, which functions to relieve at least in part the residual stress present in the bead region and area adjacent thereto, thereby reducing the warpage of the glass sheet, probability of low-quality score-line and the likelihood of undesired sheet cracking during scoring.

As mentioned supra in the context of a fusion down-draw forming process, in any glass forming process involving a drawing operation of the glass material at a viscous state, normally the glass is restrained at the edge area by, e.g., a pair of rollers pinching both sides of the peripheral region. The direct contact between the glass and the roller at higher temperature and low glass viscosity would result in the formation of a knurled surface in the bead region. Normally, the bead region tends to have a varying thickness profile. For example, FIG. 1A shows bead regions BD1 and BD2 having maximal thicknesses Th(B1) and Th(B2) appreciably larger than the thickness of the center region, Th(C). Normally, between the region having a knurled surface and the quality center region having a substantially uniform thickness Th(C), there exists an intermediate region that has a substantially smooth surface due to lack of direct contact with an edge roller, but a varying thickness profile not as uniform as that of the center region. The combination of the region having the curved edge surface 104, the region with knurled surface, and the region with a substantially smooth surface and a varying thickness profile, constitutes at least in part the first peripheral region subjected to removal by using the process and apparatus according to the present disclosure. In the past, the peripheral region removal is performed typically at around room temperature, with the glass sheet, including the peripheral regions and the center region, at a substantially uniform temperature.

In the process according to the first aspect of the present disclosure, a step (V) including heating at least part of the first peripheral portion of the glass sheet is carried out before the scoring step (VI), such that the average temperature of the first peripheral portion at the location having the distance D3 from the end of the first edge surface reaches a temperate T(B) higher than the average temperature of the central region T(C), where $T(B)-T(C) \geq 40°$ C. In certain embodiments $T(B)-T(C) \geq 50°$ C., in certain embodiments $T(B)-T(C) \geq 60°$ C., in certain embodiments $T(B)-T(C) \geq 70°$ C., in certain embodiments $T(B)-T(C) \geq 80°$ C., in certain embodiments $T(B)-T(C) \geq 90°$ C., in certain embodiments $T(B)-T(C) \geq 100°$ C., in certain embodiments $T(B)-T(C) \geq 110°$ C., in certain embodiments $T(B)-T(C) \geq 120°$ C., in certain embodiments $T(B)-T(C) \geq 130°$ C., in certain embodiments $T(B)-T(C) \geq 140°$ C., in certain embodiments $T(B)-T(C) \geq 150°$ C., in certain embodiments $T(B)-T(C) \leq 200°$ C., in certain embodiments $T(B)-T(C) \leq 190°$ C., in certain embodiments $T(B)-T(C) \leq 180°$ C., in certain embodiments $T(B)-T(C) \leq 170°$ C., in certain embodiments $T(B)-T(C) \geq 160°$ C. If $T(B)-T(C) \leq 40°$ C., the benefit of thermal stress relief is normally insufficient. On the other hand, $T(B)-T(C) \geq 200°$ C. can be difficult to achieve in a short period of time in a manufacture setting, can pose technical challenges to the materials of other components used in the apparatus for removing the peripheral regions, and the extra benefit imparted by such high temperature in the peripheral region is not significant relative to situations where $T(B)-T(C)=200°$ C., and hence not warranted.

The heating element used in the process and apparatus according to the present disclosure advantageously comprises a linear-shaped heating device that extends in the same direction of the peripheral regions, especially the bead region, if any, of the glass sheet. Such linear-shaped heating device can be one or more of: an electrical resistive heating winding, such as Pt winding, Nickel-alloy winding; a SiC heating bar; a $MoS_2$ heating bar; a tungsten filament; an IR lamp; and the like. Desirably, the heating elements emit an irradiation at a wavelength highly absorptive by the glass sheet material. The irradiation can be directed substantially only to the peripheral portions of the glass sheet during heating using irradiation shade, reflective mirrors, refractive lenses or combinations thereof. Desirably, the heating elements can be moved relative to the peripheral portions to adjust the distance between them to achieve the most desirable heating power and heating effect. In certain embodiments, a single heating element is used to heat the whole peripheral region from the vicinity of the upper edge surface to the vicinity of the lower edge surface. In certain other embodiments, a plurality of heating elements, arranged serially and/or in parallel to each other, are used to heat the full peripheral region extending from the vicinity of the upper edge surface to the vicinity of the lower edge surface. It is desired that the peripheral region along the full height from the vicinity of the top surface to the vicinity of the bottom surface is heated. In certain embodiments, the heating elements are placed only on one side of the glass sheet. In other embodiments, the heating elements are placed on one side only, and a mirror is placed on the opposite side to reflect any irradiation transmitted through the glass sheet back to the glass sheet to achieve a high heating efficiency. In other embodiments, heating elements are placed on both sides of the glass sheet to heat both sides of the peripheral portion simultaneously. In certain embodiments, it is desired to heat the peripheral region preferentially from the top to the bottom depending on the stress profile existing in the glass sheet. For example, for glass sheets made by a typical down-draw process, it is desired that the peripheral regions in proximity to the upper edge surface and the lower edge surface is heated by a lower heating power than the middle section of the first peripheral portion, because typically the residual stress in the peripheral regions in proximity to the upper and lower edge surfaces is lower than in the middle section as shown in the stress profile shown in FIG. 5. The goal of the preferential heating prior to the scoring step is to relieve the residual stress present in the peripheral portion, as discussed supra. Thus, efforts should be made that the heating does not introduce extra, unwanted stress to the glass sheet.

The heating power of each heating element can be chosen by the need of the particular glass finishing operation, depending on factors such as glass composition, bead thickness, center thickness, desired bead temperature upon heating, and the like. In general, it is desired that the peripheral portion is heated to a target temperature within 15 seconds, in certain embodiments within 10 seconds, in certain other embodiments within 5 seconds, in certain other embodiments within 3 seconds. In an exemplary set-up, SiC glow-bars having a nominal power of 5 KW are used to heat a bead region of a glass sheet having a Th(C) of about 300 μm.

The area of the peripheral portion to be removed to be heated in step (V) of the present disclosure can be important for successful removal of the peripheral portion. It is desired that the area in the peripheral portion having the highest residual stress is heated specifically to the highest temperature relative to the center region of the glass sheet, as this would function to relieve the stress as much as possible. To that end, a stress gauge, such as a polarimeter may be used to measure the residual stress in the peripheral portion of the glass sheet, whereby the area with the highest residual stress is determined and identified as the area to be exposed to the heater irradiation. Optical elements, such as lenses, reflectors, deflectors, absorbers, and the like, can be used to focus the irradiation from the heater to the identified area with the highest stress such that it receives the highest heating power.

In certain embodiments of the process according to the first aspect of the present disclosure, the first mechanical restrainer comprises a plurality of suction cups adapted for contacting and engaging with the second major surface at distance D3 and a vertical pushing bar adapted for contacting and pushing the first major surface towards the suction cups, and step (IV) comprises:

(IV-1) pushing the first major surface towards the second major surface; and (IV-2) engaging the suction cups with the second major surface.

In certain specific embodiments, in step (IV-2), the engagement of the plurality of suction cups to the second major surface of the first peripheral portion is completed in at most 5 seconds, in certain embodiments in at most 1 second, in certain other embodiments in at most 0.5 second, in certain other embodiment in at most 0.4 second, in certain other embodiments in at most 0.3 second.

In certain other embodiments of the process according to the first aspect of the present disclosure, in step (IV), the first mechanical restrainer comprises a first pair of clamps adapted for contacting and engaging with the first major surface and the second major surface at distance D3, and step (IV) comprises:

(IV-1) engaging the first pair of clamps with the first and second major surfaces.

In certain specific embodiments, in step (IV-1), the engagement of the first pair of clamps to the first major surface and the second major surface of the first peripheral portion is completed in at most 5 seconds, in certain embodiments in at most 1 second, in certain other embodiments in at most 0.5 second, in certain other embodiment in at most 0.4 second, in certain other embodiments in at most 0.3 second.

In certain embodiments of the process according to the first aspect of the present disclosure, the first mechanical restrainer comprises a plurality of suction cups adapted for contacting and engaging with the second major surface at distance D3 and a vertical pushing bar adapted for contacting and pushing the first major surface towards the suction cups, and step (IV) comprises:

(IV-1) pushing the first major surface towards the second major surface; and (IV-2) engaging the suction cups with the second major surface.

In certain specific embodiments, in step (IV-2), the engagement of the plurality of suction cups to the second major surface of the first peripheral portion is completed in at most 5 seconds, in certain embodiments in at most 1 second, in certain other embodiments in at most 0.5 second, in certain other embodiment in at most 0.4 second.

As a result of the inclusion of step (IV), i.e., the step of restraining the first and second major surfaces in the vicinity of the first side edge at a distance D3 from the end of the first side edge surface, where D3<D2, the engagement of the first mechanical restrainer to the first and/or second major surfaces of the glass sheet is greatly facilitated compared with a process where only suction cups are used instead to restrain the glass sheet. Compared to a process utilizing suction cups only, the process of the present disclosure in certain embodiments using a first pair of clamps or a combination of suction cups and vertical pushing bar reduces the engagement completion time by at least ¼, in certain embodiments by at least ⅓, in certain other embodiments by at least ½. Where suction cups are used to restrain the glass sheet, the engagement of the suction cups with a surface of the glass sheet typically include a step of contacting the suction cups with the surface of the glass sheet, followed by applying a vacuum to the internal cavity of the suction cups, as is typical in industrial suction cups, to effect a firm and robust engagement therebetween. Firm and robust engagement of the suction cups to the surface of the glass sheet would allow for tensioning of the glass sheet via the glass sheet. As used herein, suction cup engagement completion time is defined as the time interval between the moment when the first suction cup touches the second major surface and the moment when all suction cups are securely engaged with the second major surface, e.g., when the internal air pressure inside all the suction cup cavities has been reduced to at most 60 kPa, in certain embodiments at most 50 kPa, in certain other embodiments at most 40 kPa. As used herein, engagement completion time of the first pair of clamps is defined as the time interval between the moment the first pair of clamps are first activated for the purpose of engagement to the moment where the clamps are firmly in contact with both the first and second major surfaces.

For glass sheets with a high flexibility, i.e., glass sheets having a FXTY=LD/Th≥1000, where FXTY is flexibility, LD is the larger dimension in mm of the glass sheet of the width, measured from the end of the first side edge surface to the end of the second side edge surface, and the height, measured from the upper edge surface to the lower edge surface, and Th is the thickness of the quality area of the glass sheet in mm, the engagement of the glass sheet with the suction cups and/or the first pair of clamps is an important process parameter for process stability, and for suction cups, it can be quite long if not aided by a vertical pushing bar 217. Typically, the larger the flexibility of the glass sheet, the more likely the glass sheet is to warp across the plane, and the more likely it would take longer to engage the glass sheet with the suction cups if not aided by a pushing bar. Thus, the process of the present disclosure where a first pair of clamps or a combination of suction cups and pushing bar is used is especially advantageous for bead removal of the glass sheets with a FXTY≥1000, even more advantageous where FXTY≥2000, even more advantageous where FXTY≥3000, even more advantageous where FXTY≥4000, even more advantageous where FXTY≥5000, even more advantageous where FXTY≥6000, even more advantageous where FXTY≥7000, even more advantageous where FXTY≥8000, even more advantageous where FXTY≥9000, even more advantageous where FXTY≥10000. Moreover, due in part to the inclusion and implementation of step (IV), the process of the present disclosure using a first pair of clamps or a combination of suction cups and pushing bar reduces the variability of first mechanical restrainer engagement completion time from run to run, and the variability of engagement completion time from glass sheet with one FXTY to a different glass sheet with a different FXTY. Thus, the process in those embodiments can be used for making a large variety of glass sheet products with a large process window.

In certain embodiments of the process according to the first aspect of the present disclosure, in step (II), the first and second major surfaces in the vicinity of the upper edge surface are secured to a suspension device by using a clamp. The clamp can be affixed to an overhead glass sheet conveyor device. The clamp can be engaged with the glass sheet before the glass sheet moves into the apparatus of the present disclosure for removing the peripheral portion, and then the glass sheet is transferred into the apparatus for peripheral portion finishing. Before the engagement of the glass sheet with the first pair of clamps, the clamp securing the upper portion of the glass sheet would substantially provide the force to counteract the gravity of the glass sheet, and suspend the glass sheet in a vertical position. Alternatively, suction cups may be used to secure the upper portion of the glass sheet in place of the clamp. The location in the vicinity of the upper edge surface secured by the clamp, suction cups and the like, has a minimal distance $D0$ from the end of the first side edge surface.

In certain embodiments, in step (III), the first and second major surfaces in the vicinity of the first side edge surface are secured by a clamp (or suction cups or other securing devices) at a distance $D1$ from the end of the first side edge surface from the upper edge surface to the lower edge surface. In certain embodiments, $5\ cm \leq D1 \leq 50\ cm$, in certain embodiments $5\ cm \leq D1 \leq 40\ cm$, in certain embodiments $5\ cm \leq D1 \leq 30\ cm$, in certain embodiments $5\ cm \leq D1 \leq 20\ cm$, in certain embodiments $5\ cm \leq D1 \leq 15\ cm$, in certain other embodiments $5 \leq D1 \leq 10\ cm$. Normally, $D1 \leq D0$.

In certain embodiments of the process according to the first aspect of the present disclosure, step (VII) precedes step (VI), and in step (VI), a mechanical score wheel is used to press against the first major surface to form the score-line. Normally, where a mechanical score-wheel is used to form a score-line on a surface of a glass sheet, a support device such as a nosing strip on the opposing side of the glass sheet is needed to enable sufficient contact force of the score-wheel to the surface of the glass sheet and the formation of a consistent, continuous score-line on the first major surface of the glass sheet. The presence of the nosing strip is particularly beneficial when scoring glass sheets with a high FXTY. Alternatively, the score-line can be formed by a laser process, e.g., by scanning with a $CO_2$ laser followed by a cooling jet to form a vent. Where laser scoring is utilized, the back-up nosing may be unnecessary in the score-line forming process and as such, step (VII) does not necessarily precede step (IV).

While the process and apparatus according to the various aspects of the present disclosure are particularly advantageous for finishing glass sheets with a high flexibility FXTY as discussed above, it is particularly advantageous for finishing glass sheets with a center thickness $Th(C)$ of at most 500 µm, in certain embodiments at most 400 µm, in certain embodiments at most 300 µm, in certain embodiments at most 200 µm, in certain embodiments at most 150 µm, in certain embodiments at most 100 µm. This is because, when the $Th(C)$ of the glass sheet is so small, the warpage of the glass sheet along the first and second peripheral portions induced by residual stress in the peripheral portion can be so large that engaging with the score-wheel becomes very difficult. In addition, the warp can render the use of suction cups to engage and restrain the peripheral portions impractical.

As discussed above, due to the presence of step (V) involving preferential heating of the peripheral portion, and the step (IV) of restraining the first peripheral portion with the first mechanical restrainer, the process and apparatus according to the various aspects of the present disclosure have the advantage of a large process window capable of finishing large glass sheet with a high flexibility. This is particularly advantageous for glass sheet with a large vertical height HT, in which direction the glass sheet can exhibit substantial warpage and difficulty in engaging with the second major surface if suction cups are used. Thus, the process and apparatus are particularly advantageous for glass sheets having a height of at least 1000 mm, in certain embodiments at least 1200 mm, in certain other embodiments at least 1500 mm, in certain other embodiments at least 1800 mm, in certain other embodiments at least 2000 mm, in certain other embodiments at least 2500 mm, in certain other embodiments at least 3000 mm.

Similarly, the process and apparatus are particularly advantageous for glass sheets with a large width WD, measured from the end of the first side edge surface to the end of the second side edge surface. Thus, the process and apparatus according to the various aspects of the present disclosure are particularly advantageous for finishing glass sheets having a width of at least 1000 mm, in certain embodiments at least 1200 mm, in certain other embodiments at least 1500 mm, in certain other embodiments at least 1800 mm, in certain other embodiments at least 2000 mm, in certain other embodiments at least 2500 mm, in certain other embodiments at least 3000 mm.

The process and apparatus of the present disclosure are particularly advantageous for finishing glass sheets made by the fusion down-draw process pioneered by Corning Incorporated, Corning, N.Y. This is because in the fusion down-draw processes, the glass ribbon below the forming device, such as the isopipe and the slot, tends to undergo a temperature gradient profile leading to substantial thermal residual stress in the glass sheet produced, leading to warp in the peripheral portions defying the removal thereof in the later finishing step.

In certain embodiments of the process and apparatus according to the first and second aspects of the present disclosure, it is advantageous that the distance from the score-line to the end of the first side edge surface is $D2$, where $4\ cm \leq D2 \leq 40\ cm$, in certain embodiments $4\ cm \leq D2 \leq 40\ cm$, in certain embodiments $4\ cm \leq D2 \leq 30\ cm$, in certain embodiments $4\ cm \leq D2 \leq 20\ cm$, in certain embodiments $4\ cm \leq D2 \leq 15\ cm$, in certain other embodiments $4\ cm \leq D2 \leq 10\ cm$. In general, it is desired that the score-line is formed at a location where the thickness of the glass sheet is substantially the same as that of the quality area of the glass sheet, thus resulting in an as-cut glass sheet at the end of the process with a substantially uniform thickness from edge to edge.

In step (V), the first pair of clamps engage the first and second major surfaces of the glass sheet. The contact location of the first pair of clamps should be between the score-line and the end of the first side edge surface, i.e., $D3 < D2$. In certain embodiments, $0.5\ cm \leq D3 \leq 20\ cm$, in certain embodiments $0.5\ cm \leq D3 \leq 15\ cm$, in certain embodiments $0.5\ cm \leq D3 \leq 10\ cm$, in certain embodiments $0.5\ cm \leq D3 \leq 8\ cm$, in certain embodiments $0.5\ cm \leq D3 \leq 5\ cm$, in certain other embodiments $0.5\ cm \leq D3 \leq 3\ cm$.

In certain embodiments of the processes of the first aspect of the present disclosure, step (III) precedes step (IV); and in other embodiments, steps (III) and (IV) are carried out substantially simultaneously. Furthermore, for glass sheets with a high FXTY, especially those with a center thickness $Th(C)$ of at most 300 µm, it is highly desired that step (IV) is carried out after the completion of steps (III) and (V). In these desirable embodiments, the peripheral portion of the glass sheet is securely restrained and heated to the desired temperature when the glass sheet is being scored, substantially reducing score-wheel slippage or extraordinarily high pressing force applied by the score-wheel to the glass sheet, and significantly improving the yield of the scoring step and the overall process. Indeed, during step (IV), the first mechanical restrainer and the restraining means implemented in step (III) my together apply a tension to the glass sheet, such that the glass sheet between them are maintained substantially flat, thereby facilitating the successful formation of a consistent score-line. As mentioned supra, a nosing strip supporting the opposing surface is highly desired when the glass sheet is being scored. It is desired that the material directly in contact with the first and second major surfaces have sufficient rigidity so that the glass sheet does not undergo appreciable shape change when being finished. Thus, the material of the nosing strip and the part of the clamps directly contacting the first and/or second major surfaces can be selected from metals, such as aluminum, stainless steel, and the like, or hard, durable plastic or rubber materials, such as hard silicone rubber material.

In certain advantageous embodiments of the apparatus according to the second and/or third aspects of the present disclosure, the nosing strip has a Shore A hardness not lower than the glass sheet. The high hardness of the nosing strip prevents the glass sheet from excessive local deformation when pressed by a mechanical score-wheel, thereby enabling the consistent formation of score-line with consistent vent depth and without loss of touch of the score-wheel with the surface of the glass sheet and thereby loss of vent. A continuous score-line with substantially uniform vent depth extending from the vicinity of the upper edge surface to the vicinity of the lower edge surface is beneficial for the separation of the peripheral portion in step (VII) without creating sharp edges, excessive glass chips, non-straight edge and other undesired features. To that end, the nosing strip material directly contacting the first major surface of the glass sheet can be selected from a metal, such as aluminum and alloys thereof, stainless steel, and hard plastic and rubber materials with the desired temperature capability and hardness. Furthermore, it is desired that the nosing strip is supported by a seat that is sufficiently rigid such that the nosing strip remains substantially linear when the score wheel presses the first major surface of the glass against the nosing strip.

The present invention is further illustrated by the following non-limiting examples.

EXAMPLES

Example 1

Figure 2:
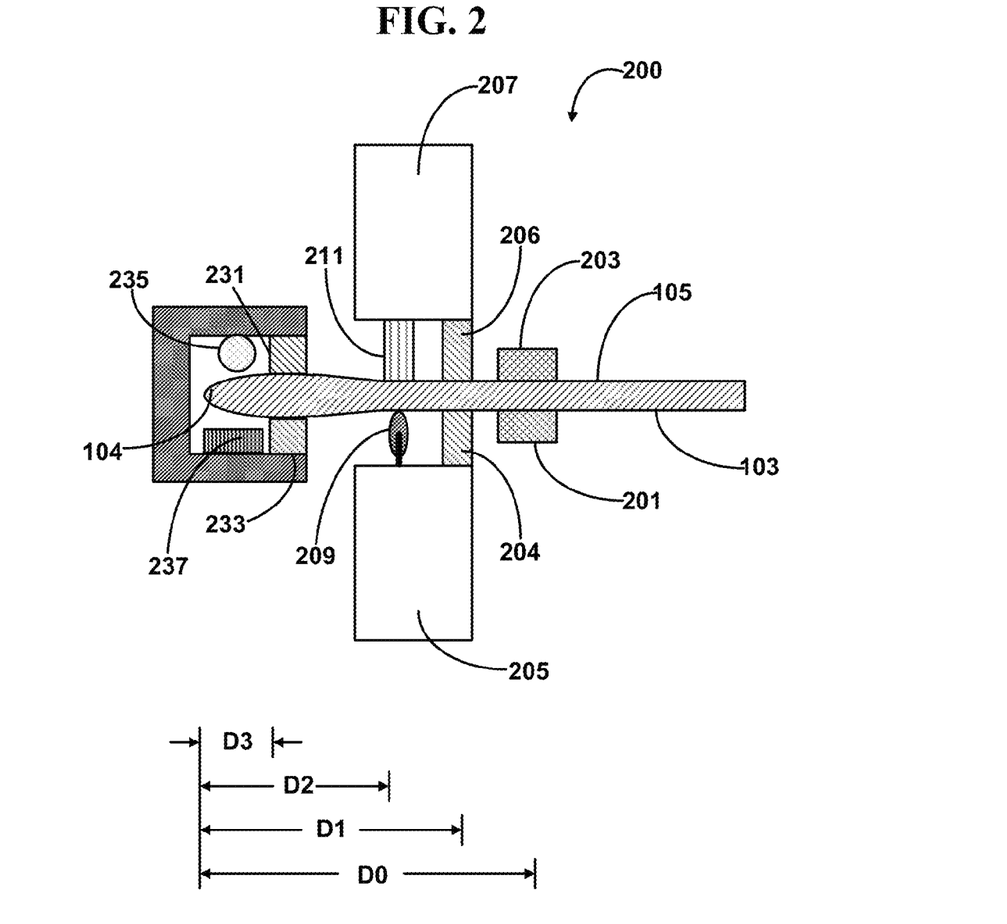
FIG. 2 is a schematic illustration of an apparatus according to one embodiment of the present disclosure using a bead heater before bead removal.

FIG. 2 schematically illustrates a cross-sectional view of one end of a glass sheet bead removing apparatus 200 in operation according to certain embodiments of the first and second aspects of the present disclosure. The other end, substantially symmetrical to the end illustrated, is not shown. The glass sheet shown in FIG. 1 is being secured by the two clamping arms 201, 203 of a clamp affixed to a suspension device (not shown) such as a vertical glass sheet suspension conveyor. Normally, the glass sheet is first engaged with the clamping arms 201 and 203 outside of the peripheral portion removing apparatus 200, and then moved into the apparatus 200 by the conveyor. Inside the peripheral portion removing apparatus 200, a first side edge restraining tower 205 comprising a first side edge restraining clamp strip 204 is located on the side of the first major surface 103 of the glass sheet, and a second side edge retraining tower 207 comprising a second side edge restraining clamp strip 206 is located on the side of the second major surface 105 of the glass sheet. Thus, during operation, the first and second side edge restraining clamp strips 204 and 206 move towards each other once the glass sheet is positioned inside the apparatus 200, engage the glass sheet, restrain the portion of the glass sheet close to the bead region, and secure the glass sheet to enable the following steps. A first pair of clamps 231 and 233 is then activated to engage the second and first major surfaces of the glass sheet at a location with a distance D3 from the end of the first side edge surface. The engagement of the clamping towers 205 and 207 as well as the first pair of clamps 231 and 233 can be completed within a very short period of time. Once the glass sheet is clamped by the restraining towers 205 and 207 and the first pair of clamps 231 and 233, a linear-shaped heating bar 235 in the vicinity of the surface 104 is turned on. Infrared irradiation emitted from the heating bar 235 is projected to and absorbed by the peripheral portion of the glass sheet. A mirror 237, placed on the opposite side of the glass sheet relative to the heating bar 235, reflects non-absorbed IR irradiation back to the peripheral portion, resulting in a high heating efficiency. In an alternative embodiment, the peripheral portion is heated to the desired temperature before the first pair of clamps are engaged with the glass sheet, so that the clamps would not block the view of the heaters of the area of the peripheral portion to be heated.

Once the peripheral region is heated to a predetermined, desirable temperature, the heating bar is turned off, and a score-wheel 209, installed on the first side edge restraining tower 205, touches the first major surface 103 of the glass sheet at a location in the vicinity of the upper edge surface, but does not directly touch the very edge line of the upper edge surface. Backed by a nosing strip 211, installed on the second side edge restraining tower 207 and extending from the upper edge surface to the lower edge surface, the score-wheel moves along the peripheral portion from top to bottom or bottom to top, thus creates a score-line extending from the vicinity of the upper edge surface to the vicinity of the lower edge surface. Once scoring is completed, the score-wheel is retracted from the first major surface. Thereafter, the first pair of clamps, while being engaged, is activated to push the first peripheral portion of the glass sheet in a direction from the first major surface to the second major surface, while the glass sheet rests on the nosing strip on the second major surface. The resultant stress, when increasing to a threshold level, will cause the peripheral portion to break along the score-line. Thereafter, the first pair of clamps 231 and 233 can be released from the separated piece of glass, leaving the separated peripheral portion to drop to the floor or a collector below the apparatus. Alternatively, the first pair of clamps 231 and 233 may be actuated such that they transfer the broken peripheral portion to another location, where they are disengaged to release the broken peripheral portion safely. The first and second restraining clamp strips 204 and 206 of the restraining towers then move away from each other, releasing the two side portions of the remaining quality area. The quality portion of the glass sheet is then moved out of the peripheral portion removing apparatus 200 by the suspension conveyor to the next process step, such as edge finishing, washing, cleaning, and the like.

Example 2

Figure 3:
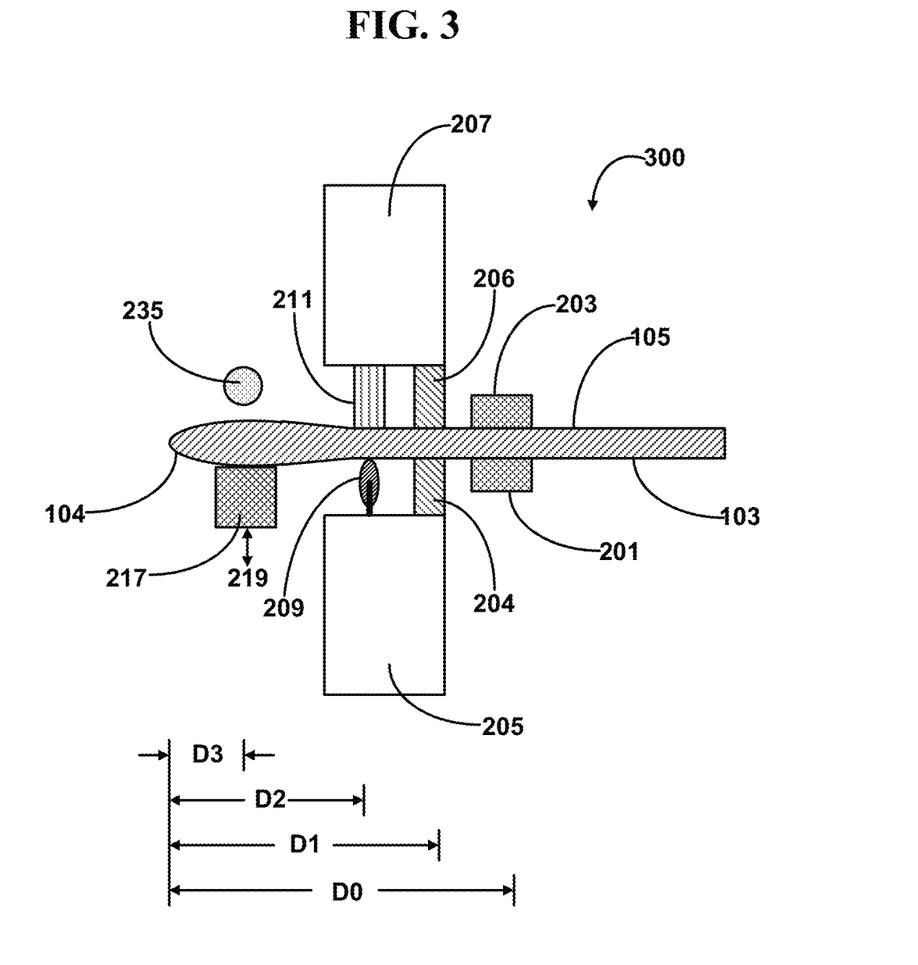
FIG. 3 is a schematic illustration of an apparatus according to another embodiment of the present disclosure using a bead heater before bead removal.

FIG. 3 schematically illustrates a cross-sectional view of one end of a glass sheet bead removing apparatus 200 in operation according to another example. The other end, substantially symmetrical to the end shown, is not shown. In this example, the glass sheet shown in FIG. 1 is being secured by the two clamping arms 201, 203 of a clamp affixed to a suspension device (not shown) such as a vertical glass sheet suspension conveyor. Normally, the glass sheet is first engaged with the clamping arms 201 and 203 outside of the peripheral portion removing apparatus 200, and is then moved into the apparatus 200 by the conveyor. Inside the peripheral portion removing apparatus 200, a first side edge restraining tower 205 comprising a first side edge restraining clamp strip 204 is located on the side of the first major surface 103 of the glass sheet, and a second side edge retraining tower 207 comprising a second side edge restraining clamp strip 206 is located on the side of the second major surface 105 of the glass sheet. A linear-shaped heating bar 235 is placed in proximity to the peripheral portion on the opposite side of a vertical pushing bar 217. Thus, during operation, the first and second side edge restraining clamp strips 204 and 206 move towards each other once the glass sheet is positioned inside the apparatus 200, engage the glass sheet, restrain the portion of the glass sheet close to the bead region, and secure the glass sheet to enable the following steps. Once the glass sheet is clamped on both sides by the restraining towers (only one side shown in this figure), the heating bar 235 is turned on to preferentially heat the peripheral portion to a predetermined, desired temperature. Afterwards, a score-wheel 209, installed on the first side edge restraining tower 205, touches the first major surface 103 of the glass sheet at a location in the vicinity of the upper edge surface, but does not directly touch the very edge line of the upper edge surface. Backed by a nosing strip 211, installed on the second side edge restraining tower 207 and extending from the upper edge surface to the lower edge surface, the score-wheel forms a score-line extending from the vicinity of the upper edge surface to the vicinity of the lower edge surface by scoring from the top to the bottom of the glass sheet. Once scoring is completed, the score-wheel is retracted from the first major surface. The straight pushing bar 217 then advances in the direction 219 towards the first major surface of the glass sheet, contacts the peripheral portion of the glass sheet, and pushes the first major surface of the peripheral portion towards the second major surface of the glass sheet. When the pushing reaches a threshold level, the peripheral portion, including the bead region, separates along the score-line. The first and second restraining clamp strips 204 and 206 of the restraining towers then move away from each other, releasing the two side portions of the remaining quality area. The quality portion of the glass sheet is then moved out of the peripheral portion removing apparatus 200 by the suspension conveyor to the next process step, such as edge finishing, washing, cleaning, and the like.

Example 3

Figure 4:
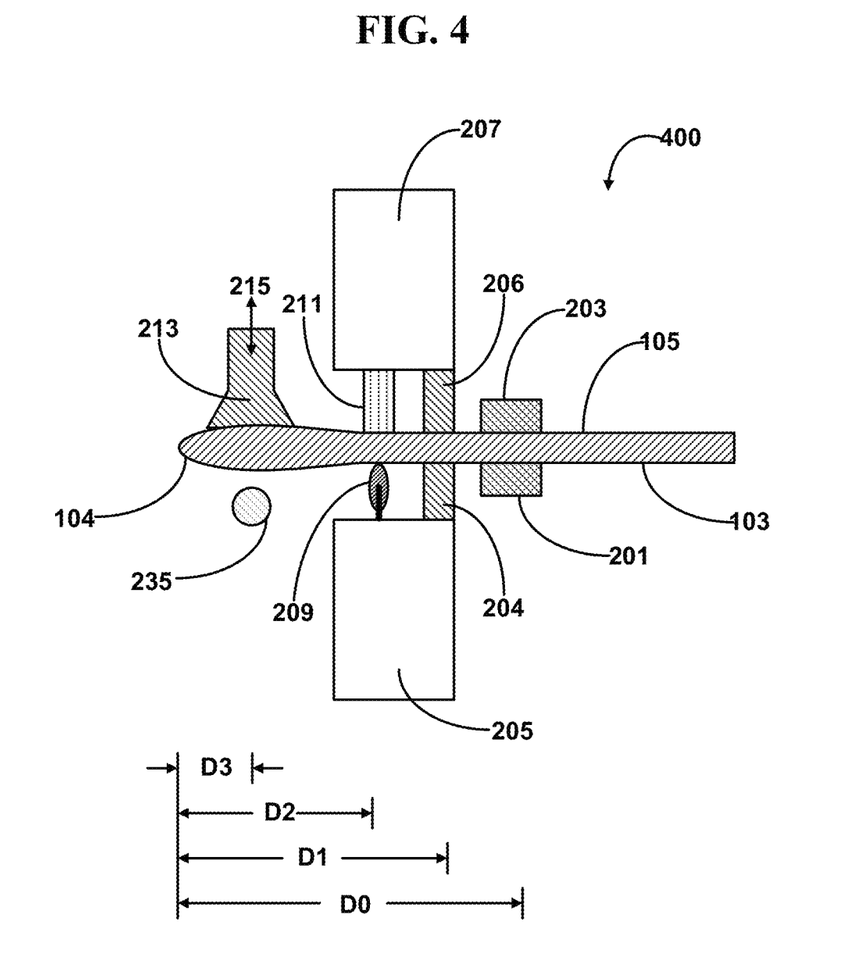
FIG. 4 is a schematic illustration of an apparatus according to another embodiment of the present disclosure using a bead heater before bead removal.

FIG. 4 schematically illustrates a cross-sectional view of one end of a glass sheet peripheral portion removing apparatus 400 in operation. The other end, being symmetrical, is not shown. As can be seen, compared to the apparatus 300 of FIG. 3, the apparatus 400 comprises suction cup(s) 215, but does not comprise the pushing bar 217. During operation, the first and second side edge restraining clamp strips 204 and 206 move towards each other once the glass sheet is positioned inside the apparatus 200, engage the glass sheet, restrain the portion of the glass sheet close to the bead region, and secure the glass sheet to enable the following steps. Once the glass sheet is clamped on both sides by the restraining towers (only one side shown in this figure), the heating bar 235 is turned on to preferentially heat the peripheral portion to a predetermined, desired temperature. Afterwards, a score-wheel 209, installed on the first side edge restraining tower 205, touches the first major surface 103 of the glass sheet at a location in the vicinity of the upper edge surface, but does not directly touch the very edge line of the upper edge surface. Backed by a nosing strip 211, installed on the second side edge restraining tower 207 and extending from the upper edge surface to the lower edge surface, the score-wheel forms a score-line extending from the vicinity of the upper edge surface to the vicinity of the lower edge surface by scoring from the top to the bottom of the glass sheet. Once scoring is completed, the score-wheel is retracted from the first major surface. A series of suction cups 213 (only one shown) then advances in the direction 215 towards the first major surface of the glass sheet, contacts the peripheral portion of the glass sheet, and pulls the second major surface of the peripheral portion in a direction away from the first major surface. When the pulling reaches a threshold level, the peripheral portion, including the bead region, separates along the score-line. The first and second restraining clamp strips 204 and 206 of the restraining towers then move away from each other, releasing the two side portions of the remaining quality area. The quality portion of the glass sheet is then moved out of the peripheral portion removing apparatus 200 by the suspension conveyor to the next process step, such as edge finishing, washing, cleaning, and the like.

Example 4

In this example, the stress profiles of a glass sheet having a width of approximately 50 inches (127 cm) prior to and after bead heating is conducted to both peripheral portions comprising bead are compared. Data are provided in TABLE I, below. In TABLE I, the data X are distance from the end of the first side edge surface, and the stress is calculated stress along a cross-section illustrated in FIG. 1A. From the data it can be easily seen that the overall stress in the glass sheet was reduced significantly as a result of the heating of the two peripheral portions. The stress spikes in the two peripheral portions are drastically reduced. This shows the effectiveness of bead-heating on relieving residual stress in a glass sheet.

It will be apparent to those skilled in the art that various modifications and alterations can be made to the present invention without departing from the scope and spirit of the invention. Thus, it is intended that the present invention cover the modifications and variations of this invention provided they come within the scope of the appended claims and their equivalents.

TABLE I

| | Stress (Psi) | |
|---|---|---|
| X (inch) | Before heating | After heating |
| 0 | 1035.957 | 525.5584 |
| 0.501775 | 918.7182 | 456.2097 |
| 1.003549 | 695.7068 | 328.3162 |
| 1.505324 | 499.7725 | 223.0735 |
| 2.007098 | 335.0438 | 139.5022 |
| 2.508873 | 200.4735 | 73.75368 |
| 3.010647 | 93.68041 | 22.76372 |
| 3.512422 | 11.66753 | −15.6922 |
| 4.014196 | −49.0708 | −43.5675 |
| 4.515971 | −92.2668 | −62.7739 |
| 5.017745 | −121.504 | −75.1146 |
| 5.51952 | −139.969 | −82.1937 |
| 6.021294 | −150.333 | −85.3575 |
| 6.523069 | −154.75 | −85.6891 |
| 7.024843 | −154.9 | −84.027 |

TABLE I-continued

| | Stress (Psi) | |
|---|---|---|
| X (inch) | Before heating | After heating |
| 7.526618 | −152.073 | −81.0112 |
| 8.028392 | −147.236 | −77.1176 |
| 8.530167 | −141.105 | −72.6992 |
| 9.031941 | −134.206 | −68.0093 |
| 9.533716 | −126.921 | −63.2309 |
| 10.03549 | −119.519 | −58.4902 |
| 10.53726 | −112.195 | −53.8809 |
| 11.03904 | −105.075 | −49.46 |
| 11.54081 | −98.2521 | −45.2689 |
| 12.04259 | −91.777 | −41.3255 |
| 12.54436 | −85.6783 | −37.6392 |
| 13.04614 | −79.9697 | −34.2131 |
| 13.54791 | −74.6538 | −31.0432 |
| 14.04969 | −69.7264 | −28.1229 |
| 14.55146 | −65.1734 | −25.4406 |
| 15.05324 | −60.9819 | −22.9874 |
| 15.55501 | −57.1314 | −20.7468 |
| 16.05678 | −53.6041 | −18.7065 |
| 16.55856 | −50.3805 | −16.8535 |
| 17.06033 | −47.4419 | −15.1758 |
| 17.56211 | −44.7681 | −13.6581 |
| 18.06388 | −42.3438 | −12.2902 |
| 18.56566 | −40.1496 | −11.059 |
| 19.06743 | −38.1705 | −9.95568 |
| 19.56921 | −36.3893 | −8.96757 |
| 20.07098 | −34.7951 | −8.08655 |
| 20.57275 | −33.3749 | −7.30378 |
| 21.07453 | −32.1167 | −6.61274 |
| 21.5763 | −31.0083 | −6.00432 |
| 22.07808 | −30.0434 | −5.47307 |
| 22.57985 | −29.2129 | −5.01246 |
| 23.08163 | −28.5088 | −4.61902 |
| 23.5834 | −27.9223 | −4.28563 |
| 24.08518 | −27.4521 | −4.00985 |
| 24.58695 | −27.0943 | −3.78891 |
| 25.08873 | −26.845 | −3.62162 |
| 25.5905 | −26.697 | −3.50211 |
| 26.09227 | −26.6531 | −3.4319 |
| 26.59405 | −26.7134 | −3.40976 |
| 27.09582 | −26.878 | −3.43611 |
| 27.5976 | −27.1473 | −3.512 |
| 28.09937 | −27.5282 | −3.64249 |
| 28.60115 | −28.022 | −3.82614 |
| 29.10292 | −28.6331 | −4.06639 |
| 29.6047 | −29.3677 | −4.36786 |
| 30.10647 | −30.2356 | −4.73747 |
| 30.60825 | −31.246 | −5.18141 |
| 31.11002 | −32.4128 | −5.71062 |
| 31.61179 | −33.744 | −6.32926 |
| 32.11357 | −35.2574 | −7.0509 |
| 32.61534 | −36.9689 | −7.88735 |
| 33.11712 | −38.8928 | −8.84862 |
| 33.61889 | −41.0514 | −9.95132 |
| 34.12067 | −43.4666 | −11.2113 |
| 34.62244 | −46.1632 | −12.648 |
| 35.12422 | −49.1657 | −14.281 |
| 35.62599 | −52.5041 | −16.1336 |
| 36.12776 | −56.2055 | −18.226 |
| 36.62954 | −60.3027 | −20.5858 |
| 37.13131 | −64.8244 | −23.238 |
| 37.63309 | −69.8016 | −26.2097 |
| 38.13486 | −75.2631 | −29.5271 |
| 38.63664 | −81.2358 | −33.2186 |
| 39.13841 | −87.732 | −37.3033 |
| 39.64019 | −94.7617 | −41.8025 |
| 40.14196 | −102.318 | −46.7293 |
| 40.64374 | −110.373 | −52.0868 |
| 41.14551 | −118.861 | −57.8604 |
| 41.64728 | −127.679 | −64.0157 |
| 42.14906 | −136.654 | −70.4827 |
| 42.65083 | −145.537 | −77.1539 |
| 43.15261 | −153.957 | −83.8565 |
| 43.65438 | −161.39 | −90.3359 |
| 44.15616 | −167.098 | −96.2212 |
| 44.65793 | −170.072 | −100.994 |
| 45.15971 | −168.944 | −103.933 |
| 45.66148 | −161.892 | −104.064 |
| 46.16325 | −146.548 | −100.09 |
| 46.66503 | −119.911 | −90.3413 |
| 47.1668 | −78.3127 | −72.7407 |
| 47.66858 | −17.4909 | −44.8141 |
| 48.17035 | 67.20928 | −3.7336 |
| 48.67213 | 180.494 | 53.66248 |
| 49.1739 | 326.8538 | 131.127 |
| 49.67568 | 510.4963 | 233.6143 |
| 50.17745 | 734.7595 | 367.3301 |
| 50.67923 | 998.4453 | 536.1784 |
| 51.181 | 1139.513 | 629.5223 |

What is claimed is:

1. A process for removing a first peripheral portion of a glass sheet, the process comprising steps of:
   (I) providing a glass sheet having a first major surface, a second major surface opposing the first major surface, a center region having a center thickness $Th(C)$ and an average center temperature $T(C)$, an upper edge surface, a lower edge surface, a first side edge surface and a second side edge surface, each edge surface connecting the first major surface and the second major surface, and the first peripheral portion is in a vicinity of the first side edge surface and has an average thickness $Th(B)$, where $Th(B) > 1.1\, Th(C)$;
   (II) placing the glass sheet in a predetermined position by securing the first and second major surfaces in a vicinity of the upper edge surface to a suspension device;
   (III) after step (II), restraining the first and second major surfaces in a vicinity of the first side edge surface at a distance $D1$ from an end of the first side edge surface from the top edge surface to the lower edge surface;
   (IV) after step (II), restraining at least the second major surface in a vicinity of the first side edge surface at a distance $D3$ from the end of the first side edge surface using a first mechanical restrainer, where $D3 < D1$;
   (V) heating at least part of the first peripheral portion of the glass sheet such that an average temperature of the first peripheral portion at a location having the distance $D3$ from the end of the first edge surface reaches a temperate $T(B)$, where $T(B) - T(C) \geq 40°$ C.;
   (VI) after step (V), forming a score-line on the first major surface extending from a vicinity of the top edge surface to a vicinity of the lower edge surface at a distance $D2$ from the end of the first side edge surface, where $D3 < D2 < D1$;
   (VII) contacting the second major surface with a nosing strip opposing the score-line; and
   (VIII) after steps (V) and (VI), activating the first mechanical restrainer to push the first peripheral portion of the glass sheet in a direction from the first major surface to the second major surface such that the first peripheral portion of the glass sheet bends against the nosing strip and separates along the score-line from the center region of the glass sheet.

2. A process according to claim 1, wherein in step (I), the center thickness $Th(C)$ of the glass sheet is at most 400 µm.

3. A process according to claim 1, wherein in step (I), the first peripheral portion of the glass sheet as provided is warped in a direction from the upper edge surface to the lower edge surface when the glass sheet has a substantially uniform temperature at room temperature and is not subjected to an external force.

4. A process according to claim 1, wherein in step (I), the first peripheral portion of the glass sheet as provided comprises a first section with knurled surface at least on a side of the second major surface, and a second section adjacent to the first section with a smooth surface on the side of the second major surface.

5. A process according to claim 1, wherein in step (IV), the first mechanical restrainer comprises a first pair of clamps configured to contact and engage the first major surface and the second major surface at the distance D3, and step (IV) comprises:
 (IV-1) engaging the first pair of clamps with the first and second major surfaces.

6. A process according to claim 1, wherein in step (III), the first and second major surfaces in a vicinity of the first side edge surface are secured by a second pair of clamps at the distance D1 from the end of the first side edge surface.

7. A process according to claim 6, wherein the second pair of clamps extend from the top edge surface to the lower edge surface.

8. A process according to claim 1, wherein step (VII) precedes step (VI), and in step (VI), a mechanical score wheel is used to press against the first major surface and form the score-line.

9. A process according to claim 1, wherein 5 cm≤D1≤50 cm.

10. A process according to claim 1, wherein 4 cm≤D2≤40 cm.

11. A process according to claim 1, wherein 0.5 cm≤D3≤20 cm.

12. A process according to claim 5, wherein in step (IV), the first pair of clamps extends from the top edge surface to the lower edge surface.

13. A process according to claim 1, wherein step (V) comprises:
 (V-1) measuring a stress profile of the first peripheral portion;
 (V-2) identifying an area in the first peripheral portion having a highest average residual stress;
 (V-3) providing a heating irradiation from a heater; and
 (V-4) directing a highest heating power of the heating irradiation to the area in the first peripheral portion having the highest average residual stress.

14. A process according to claim 1, wherein in step (VII), the nosing strip has a hardness not lower than the glass sheet.

15. A process according to claim 14, wherein step (VII) precedes step (VI), and wherein in step (VII) the nosing strip is mounted on a support that is sufficiently rigid such that during step (VI) the nosing strip remains substantially linear when a score wheel used to form the score-line presses the first major surface of the glass sheet against the nosing strip.

16. An apparatus configured to remove a first peripheral portion of a glass sheet having a first major surface, a second major surface opposing the first major surface, a center region having a center thickness Th(C), an upper edge surface, a lower edge surface, a first side edge surface and a second side edge surface, each edge surface connecting the first major surface and the second major surface, and the first peripheral portion is in a vicinity of the first side edge surface, the apparatus comprising:
 (A) a glass suspension device configured to place the glass sheet in a predetermined position by securing the first and second major surfaces in a vicinity of the upper edge surface;
 (B) a first edge restraining tower located on a side of the first major surface comprising a first edge restraining clamp strip, and a second edge restraining tower located on a side of the second major surface comprising a second edge restraining clamp strip, wherein a distance between the first edge restraining clamp strip and the second edge restraining clamp strip being adjustable and adapted so the first edge restraining clamp strip and the second edge restraining clamp strip restrain the first and second major surfaces in a vicinity of the first side edge surface at a distance D1 from an end of the first side edge surface from the top edge surface to the lower edge surface;
 (C) a mechanical scoring wheel installed on the first edge restraining tower, where the scoring wheel is configured to be moved in a vertical direction while contacting the first major surface to form a score-line on the first major surface extending from a vicinity of the top edge surface to the lower edge surface at a distance D2 from the end of the first side edge surface, where D2<D1;
 (D) a first pair of clamps configured to engage and clamp the first and second major surfaces in a vicinity of the first side edge surface at a distance D3 from the end of the first side edge surface, where D3<D2;
 (E) a nosing strip opposing the score-line configured to contact the second major surface;
 (F) a vertical heating element configured to preferentially heat the first peripheral portion of the glass sheet; and
 (G) a force applicator configured to activate the first pair of clamps to push the first peripheral portion of the glass sheet in a direction from the first major surface to the second major surface such that the first peripheral portion of the glass sheet bends against the nosing strip and separates along the score-line from the center region of the glass sheet.

17. An apparatus according to claim 16, wherein the nosing strip has a hardness not lower than the glass sheet.

18. An apparatus according to claim 16, wherein the nosing strip is supported by a seat that is sufficiently rigid such that the nosing strip remains substantially linear when the scoring wheel presses the first major surface of the glass sheet against the nosing strip.

19. An apparatus according to claim 16, wherein the vertical heating element extends from the upper edge surface to the lower edge surface.

20. An apparatus according to claim 16, wherein the vertical heating element comprises a linear infrared irradiation emitting device located on one side of the first peripheral portion and a mirror located on an opposite side of the first peripheral portion.

21. An apparatus configured to remove a first peripheral portion of a glass sheet having a first major surface, a second major surface opposing the first major surface, a center region having a center thickness Th(C), an upper edge surface, a lower edge surface, a first side edge surface and a second side edge surface, each edge surface connecting the first major surface and the second major surface, and the first peripheral portion is in a vicinity of the first side edge surface, the apparatus comprising:
 (A) a glass suspension device configured to place the glass sheet in a predetermined position by securing the first and second major surfaces in a vicinity of the upper edge surface;
 (B) a first edge restraining tower located on a side of the first major surface comprising a first edge restraining clamp strip, and a second edge restraining tower located on a side of the second major surface comprising a second edge restraining clamp strip, wherein a distance between the first edge restraining clamp strip and the second edge restraining clamp strip being adjustable and adapted so the first edge restraining clamp strip and the second edge restraining clamp strip restrain the first and second major surfaces in a vicinity of the first side edge surface at a distance $D1$ from an end of the first side edge surface from the top edge surface to the lower edge surface;

(C) a mechanical scoring wheel installed on the first edge restraining tower, where the scoring wheel is configured to be moved in a vertical direction while contacting the first major surface to form a score-line on the first major surface extending from a vicinity of the top edge surface to the lower edge surface at a distance $D2$ from the end of the first side edge surface, where $D2<D1$;

(D) a straight, vertical bar configured to push the first major surface towards the second major surface;

(E) a vertical heating element configured to preferentially heat the first peripheral portion of the glass sheet;

(F) a nosing strip opposing the score-line configured to contact the second major surface; and (G) a force applicator configured to activate the vertical bar to push the first peripheral portion of the glass sheet in a direction from the first major surface to the second major surface such that the first peripheral portion of the glass sheet bends against the nosing strip and separates along the score-line from the center region of the glass sheet.

22. An apparatus according to claim 21, wherein the nosing strip has a hardness not lower than the glass sheet.

23. An apparatus according to claim 21, wherein the nosing strip is supported by a seat that is sufficiently rigid such that the nosing strip remains substantially linear when the scoring wheel presses the first major surface of the glass sheet against the nosing strip.

24. An apparatus according to claim 21, wherein the vertical heating element comprises a linear infrared irradiation emitting device located on one side of the first peripheral portion and a mirror located on an opposite side of the first peripheral portion.

* * * * *